US012769291B2

(12) United States Patent
Gruener et al.

(10) Patent No.: US 12,769,291 B2
(45) Date of Patent: Oct. 20, 2026

(54) MIXED OPERATION OF PRODUCTION UNITS IN HYBRID PLANTS

(71) Applicant: ABB Schweiz AG, Baden (CH)

(72) Inventors: Sten Gruener, Laudenbach (DE); Mario Hoernicke, Landau (DE); Katharina Stark, Weinheim (DE); Roland Braun, Niederkassel Lülsdorf (DE); Michael Vach, Wilhelmsfeld (DE); Nicolai Schoch, Heidelberg (DE); Marcel Dix, Allensbach (DE)

(73) Assignee: ABB Schweiz AG, Baden (CH)

( * ) Notice: Subject to any disclaimer, the term of this patent is extended or adjusted under 35 U.S.C. 154(b) by 610 days.

(21) Appl. No.: 18/300,782

(22) Filed: Apr. 14, 2023

(65) Prior Publication Data

US 2023/0251635 A1 Aug. 10, 2023

Related U.S. Application Data

(63) Continuation of application No. PCT/EP2021/075809, filed on Sep. 20, 2021.

(30) Foreign Application Priority Data

Oct. 14, 2020 (EP) .................................... 20201857

(51) Int. Cl.
*G05B 19/418* (2006.01)

(52) U.S. Cl.
CPC .................. *G05B 19/41845* (2013.01); *G05B 19/41885* (2013.01); *G05B 2219/32097* (2013.01); *G05B 2219/32124* (2013.01)

(58) Field of Classification Search
CPC ........ G05B 19/41845; G05B 19/41885; G05B 2219/32097; G05B 2219/32124; Y02P 90/02
See application file for complete search history.

(56) References Cited

U.S. PATENT DOCUMENTS

2005/0096872 A1* 5/2005 Blevins .................. G05B 17/02 702/183
2006/0259154 A1* 11/2006 Hood ................. G05B 19/4188 700/1

(Continued)

FOREIGN PATENT DOCUMENTS

CN 101183261 A 5/2008
CN 101553798 A 10/2009

(Continued)

OTHER PUBLICATIONS

Grüner, Sten et al., Cross-Industry State of the Art Analysis of Modular Automation. ResearchGate. Jul. 2020, [online], [retrieved on Sep. 25, 2025]. Retrieved from the Internet. (Year: 2020).*

(Continued)

*Primary Examiner* — Kenneth M Lo
*Assistant Examiner* — Mohammed Shafayet
(74) *Attorney, Agent, or Firm* — Fitch Even Tabin & Flannery LLP

(57) ABSTRACT

A method of integrating modules into a hybrid modular plant comprising a discrete manufacturing part and a continuous manufacturing part includes integrating the discrete part into the continuous part, comprising constructing at least one module definition file mapping one or more discrete-part units of the discrete part to a continuous-part module and importing the module definition file into an orchestration layer of the continuous part. Alternatively, the method comprises integrating the continuous part into the discrete part, comprising constructing one or more interfaces representing each continuous-part module as one or more respective discrete-part units.

13 Claims, 8 Drawing Sheets

(56) References Cited

U.S. PATENT DOCUMENTS

| | | | | |
|---|---|---|---|---|
| 2006/0259634 | A1* | 11/2006 | Hood | G05B 19/4185<br>709/230 |
| 2008/0097623 | A1* | 4/2008 | Weatherhead | G05B 19/41865<br>700/19 |
| 2011/0301734 | A1* | 12/2011 | Krehbiel | G05B 19/418<br>700/99 |
| 2015/0262095 | A1* | 9/2015 | Rajasekaran | G06Q 10/0637<br>705/7.28 |
| 2019/0052549 | A1 | 2/2019 | Duggal et al. | |
| 2020/0310394 | A1* | 10/2020 | Wouhaybi | H04L 67/12 |

FOREIGN PATENT DOCUMENTS

| | | | |
|---|---|---|---|
| CN | 102597639 | | 7/2012 |
| CN | 111164952 | | 5/2020 |
| EP | 1889127 | A2 | 2/2008 |
| EP | 1903411 | A1 | 3/2008 |
| IN | 201841047571 | A | 6/2020 |
| WO | WO 2006/124547 | A2 | 11/2006 |
| WO | WO 2010/003724 | A2 | 1/2010 |

OTHER PUBLICATIONS

Grüner et al., "An Approach for Interconnection and Unification of State Models in Discrete Manufacturing," *2018 IEEE 16th International Conference on Industrial Informatics* (INDIN), 6 pp. (Jul. 18-20, 2018).

Grüner et al., "Cross-Industry State of the Art Analysis of Modular Automation," 16 pp. (Jul. 14, 2020).

European Patent Office, Extended European Search Report in European Patent Application No. 20201857.8, 10 pp. (Apr. 1, 2021).

European Patent Office, International Search Report in International Patent Application No. PCT/EP2021/075809, 4 pp. (Dec. 10, 2021).

European Patent Office, Written Opinion in International Patent Application No. PCT/EP2021/075809, 7 pp. (Dec. 10, 2021).

China National Intellectual Property Administration, Office Action in Chinese Patent Application No. 202180070378.7, 13 pp. (Jul. 4, 2025).

* cited by examiner

MIXED OPERATION OF PRODUCTION UNITS IN HYBRID PLANTS

CROSS-REFERENCE TO RELATED APPLICATIONS

The instant patent application claims priority to International Patent Application No. PCT/EP2021/075809, filed on Sep. 20, 2021, and to European Patent Application No. 20201857.8, filed on Oct. 14, 2020, each of which is incorporated herein in its entirety by reference.

FIELD OF THE DISCLOSURE

The present disclosure generally relates to the integration of modules into a modular plant such as a hybrid modular plant.

BACKGROUND OF THE INVENTION

In process industries, Modular Type Package (MTP) is an established standard for describing module functionality and for governing communications between the module and the orchestration system. In discrete manufacturing, the Packaging Machine Language (PackML) is one standard commonly used to monitor and orchestrate production modules and production lines. Within hybrid installations combining elements of both process and discrete manufacturing, for instance in food and beverage or battery cell production, both standards (PackML, MTP) may be used to describe and operate units/machines. Those standards have different ways of integration and operation controlled, so that the DC-link voltage does not overshoot when the gate signals are disabled. Estimate for the DC-link capacitance can be obtained from voltage and current measurement when the gate signals are disabled. Can be used during power outage to absorb mechanical energy to the DC link.

BRIEF SUMMARY OF THE INVENTION

There is a need to facilitate the integration of modules into a hybrid modular plant comprising both discrete manufacturing and process industry parts. In one aspect, the present disclosure provides a generic approach to interfacing between several module standards. The present disclosure enables a transparent interface between the orchestration layer (e.g. the MTP Process Orchestration Layer or POL) and modules described by various (incompatible) standards, thus facilitating access to hybrid automation and allowing users to mix modules in greenfield plants, as well as to connect existing modules to the POL. In other words, the present disclosure enables mixed operation of hybrid modular plants (i.e. plants involving modules described in different standards) from one generic orchestration layer. Examples of those standards are MTP and PackML. It will be understood, however, that the present disclosure is not limited to those standards. Proposed is an automated or semi-automated mapping of the concept descriptions of a module as well as runtime translation built into the orchestration layer to enable interoperability between standards. Since the standards both rely on a common communication protocol, such as OPC UA, as communication and information exchange backbone, the present disclosure allows enabling of PackML interfaces within POL at a relatively low cost.

The present disclosure may include one or more aspects, examples or features in isolation or combination whether specifically disclosed in that combination or in isolation. Further aspects, examples and features of the invention will become apparent from and be elucidated with reference to the embodiments described hereinafter.

DETAILED DESCRIPTION OF THE INVENTION

Figure 1:
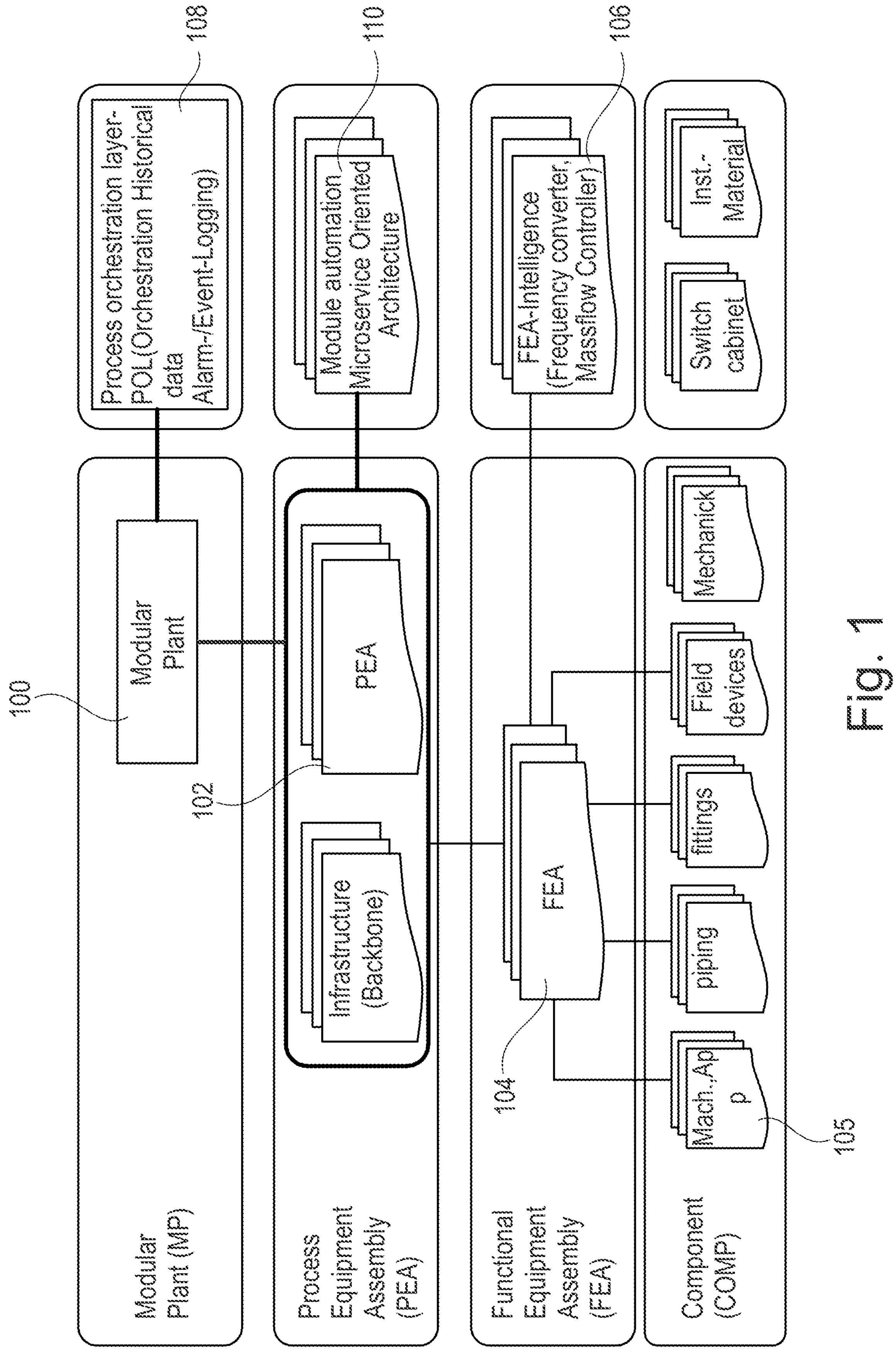
FIG. 1 illustrates the structure of a modular plant according to the MTP standard.

FIG. 1 illustrates the structure of a modular plant 100 according to the MTP standard. In the context of process automation, the modular plant 100 comprises different modules 102 (a module in MTP is also known as a Process Equipment Assembly—PEA), encapsulating components 104 such as devices and apparatuses that likewise consist of process controllers and instruments. Each module 102 has a built-in controller 106 that takes care of automating the functions provided by the module 102, as well as fault handling and other automation tasks. Each module 102 fulfills at least one process function, which is encapsulated and offered as a service. All modules 102 have process connections to other modules 102 and an information connection to the Process Orchestration Layer (POL) 108. The communication between PEA 102 and POL 108 is realized using the OPC UA communication protocol (OPC Unified Architecture, a machine-to-machine communication protocol for industrial automation governed by the OPC Foundation). A key element within the area of modular production plants is the standardization of the automation system interfaces between the module automation system 110 and the POL 108. This has been standardized by the Module Type Package (MTP), a module description or definition file which allows the integration of modules 102 into the POL 108. An MTP file typically describes a human machine interface (HMI) of a module 102, structured like a piping and instrumentation diagram (P&ID) 102, describes module services, and provides a list of built-in equipment. The MTP is a vendor independent description, which defines the interfaces to a module 102 in AutomationML (AML) format. Therefore, it can be used to integrate modules 102 into the POL 108, independently of the vendor and type of the controllers 106 used for the module 102.

Figure 2:
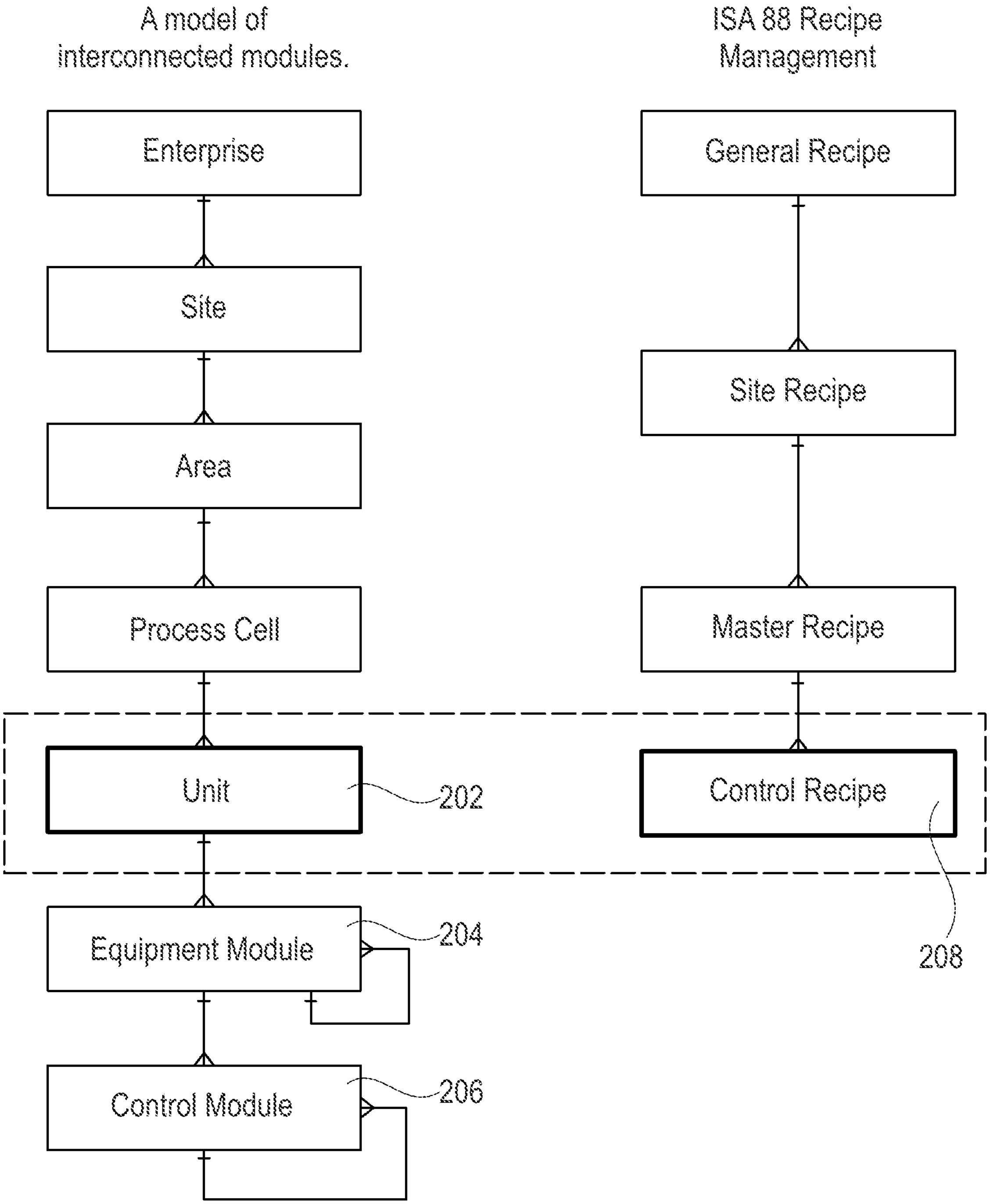
FIG. 2 illustrates a physical model of a modular plant as well as recipe management according to PackML.

FIG. 2 illustrates a physical model of a modular plant as well as recipe management according to PackML. The Packaging Machine Language (PackML) is an industrial automation standard for the control of packaging machines developed by the Organization for Machine Automation and Control (OMAC) in collaboration with the International Society of Automation (ISA). PackML suggests a standard program architecture and programming methodologies with the aim of providing a consistent appearance and handling of packaging machines for operators and technicians. The three main elements of the standard are a state-machine model, tags (PackTags) for a consistent terminology and the modular program architecture Make2Pack. The state-machine model can be adopted in almost any industrial machine since states and transitions are not exclusive for packaging machines. Modularized machine code using PackML matches the lower 3 levels of the ISA 88/IEC 61512 physical model: Unit 202, Equipment Module (EM) 204 and Control Module (CM) 206, as shown in FIG. 2. A PackML unit 202 may also be referred to as a machine. The recommended way for inter-module and line-to-module communication is to use OPC UA. The recipe is the necessary set of information that uniquely defines the production requirements of a specific product. The relationship between recipes and equipment is shown in FIG. 2. In particular, the control recipe describes the parameters which need to be set in the unit 202 for the production of one specific product. An example could be a palletizer unit 202 that receives the three process related parameters for a production order: packing pattern, number of layers and interleaf between layers.

Figure 3:
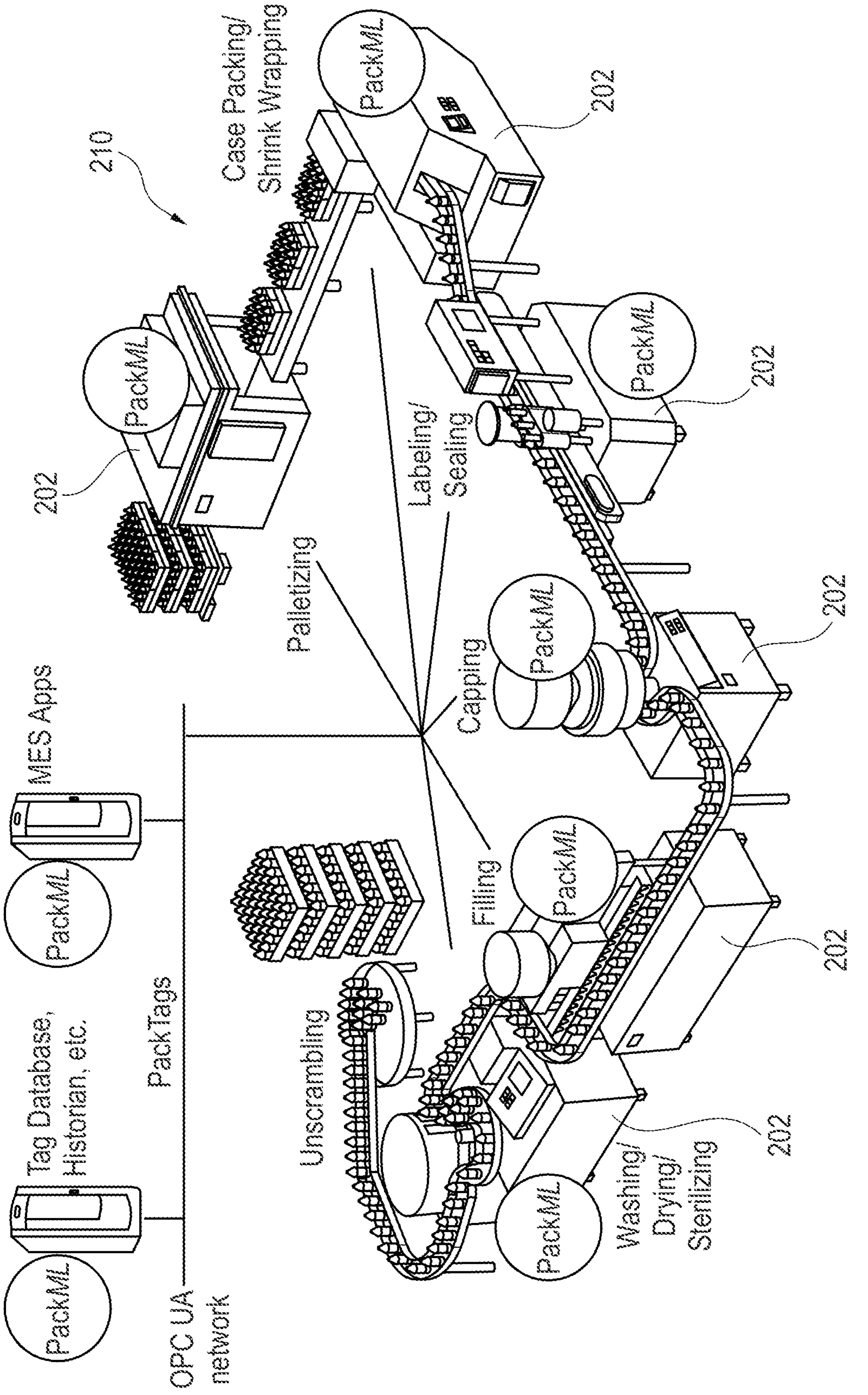
FIG. 3 illustrates the interconnection of units to form a production line in PackML.

Within MTP, the POL 108 is required to coordinate the modules 102 used in the modular plant 100, e.g., by executing a process recipe. In PackML, operation is mostly based upon inter-unit communication. PackML does therefore not require a POL but can be implemented by simply connecting the units 202 in the production line 210, as shown for example in FIG. 3. Reconciling these two contrary concepts of operation in hybrid plants has proven to be a challenge for the industry.

Described herein are methods of integrating modules into a hybrid modular plant (comprising a discrete manufacturing part and a continuous manufacturing part) by implementing either a PackML-to-MTP mapping, for example by providing the mapping of PackML package machines to MTP packages for engineering and runtime wrapping for run-time orchestration, or by implementing an MTP-to-PackML mapping, for example by creating an MTP-compatible wrapper for PackML units. This wrapping enables transparent engineering, monitoring and orchestration of PackML modules 202 and PackML-based production lines 210 in the MTP POL 108, or monitoring and control of MTP modules 102 via PackML interfaces, respectively. Control sequences or recipes running in the continuous part may be configured to execute services of the discrete part and/or control sequences or recipes running in the discrete part may be configured to execute services of the continuous part.

According to a first example, a PackML-to-MTP mapping is implemented for integrating the discrete part of the hybrid modular plant (comprising those units 202 which are interconnected using PackML) into the POL 108 of the continuous part of the modular plant (comprising the MTP modules 102). The following part of the description thus focuses on a PackML-to-MTP approach for wrapping PackML for usage in the MTP-based POL 108. Variants of the first example or PackML-to-MTP mapping include mapping single PackML units 202 one-by-one as individual MTP modules 102 into the MTP POL 108 and mapping multiple PackML units 202 combined into a production line 210 as a single MTP module 102 into the MTP POL 108. Of course, within a single hybrid plant, some PackML modules may be integrated individually while others are integrated as a production line. The PackML machines 202 are imported either at run-time or at design/engineering time. When importing the machines at run-time, the machines are present and browseable via an OPC UA interface. Importing the machines at design/engineering time depends on machine availability: any available OPC UA information model of a PackML machine 202 is used, e.g., via an OPC UA NodeSet file; alternatively, a standard set of machine states, operational modes, and PackTags is assumed, where additional modifications such as tags or operational modes are available as an export e.g., via a spreadsheet file such as Excel.

As mentioned above, in one variant of the first example, the PackML units 202 are integrated one by one into the MTP POL 108. In one example control sequences or recipes running in the continuous part may not be applied to the discrete part. Integrating the PackML units 202 entails wrapping/mapping of the description of a single PackML machine 202 into an MTP-compatible abstraction including for example one or more of the following steps: monitoring information of the PackML machine 202 such as current state, available transitions and error/alarm information via MTP-compatible interfaces; performing change of operation mode and state of the PackML machine 202 using the MTP POL 108 and the state abstraction of the MTP module 102; accessing non-functional information (included in PackML PackTags) such as machine speed or custom machine parameters via DataAssembly or ServiceParameter constructs of PackML, allowing their utilization in transitions of POL-recipes; summarizing multiple actions of the PackML machine 202 as a dedicated MTP service or procedure (for example set machine mode, write a custom set of machine parameters, modify machine speed).

The content of a PackML module may be summarized as follows: state model (standardized, but also extensible by custom sub-states); list of machine modes (three standardized modes, e.g., manual, automatic, with additional custom modes); read-only Status PackTags describing the machine status, e.g., machine speed, including some standard and some custom parameters that are machine specific); write-only Command PackTags allowing the state and mode of the machine, e.g., machine speed to be influenced, including some standard and some custom parameters that are machine specific); read-only Admin PackTags containing some standardized OEE data (e.g., total and bad product counts) and some machine-specific warning data.

Figure 4:
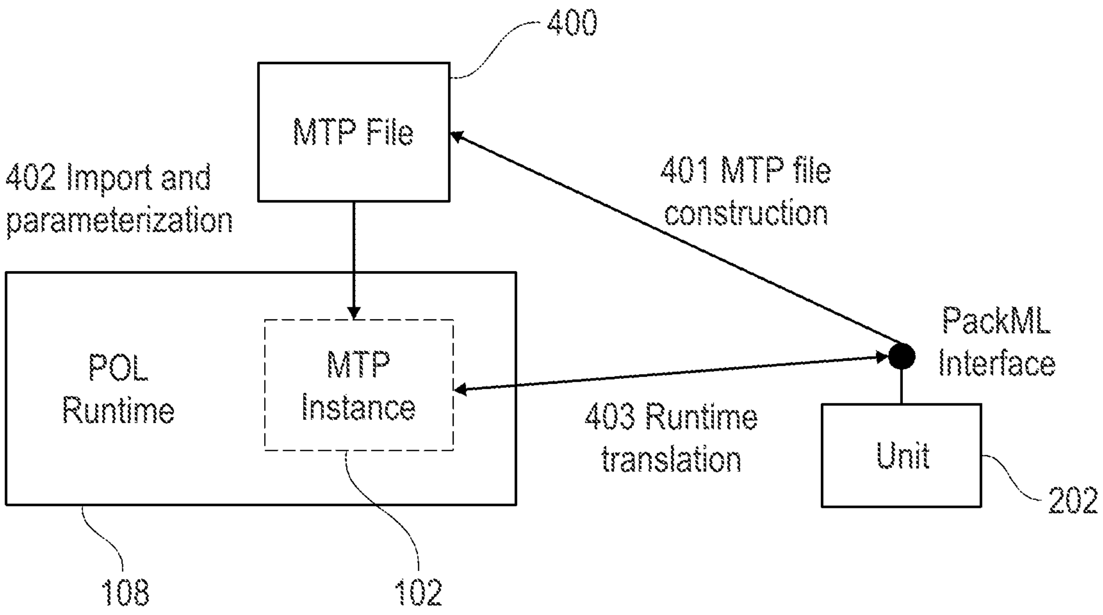
FIG. 4 illustrates a flowchart for a method of integrating individual PackML machines into the MTP process orchestration layer.

FIG. 4 illustrates method steps that may be performed to import an individual PackML machine 202 into the MTP POL 108. The method includes the steps of constructing 401 an MTP file 400; importing and parameterizing 402 the file 400 into the POL 108; and runtime translation 403 between PackML and MTP communications.

In step 401, the MTP file 400 is constructed. This may entail automated or semi-automated construction of the MTP file 400 based on the PackML (OPC UA) interface at engineering time. File construction may be carried out using a user-facing tool which is able to browse online PackML servers or load offline representation of PackML (e.g., Nodeset file or a spreadsheet) and to import them into the MTP POL 108 either directly or using an intermediate MTP file. The MTP file 400 may thus be constructed by scanning the PackML representation and generating an MTP-compatible representation in which the MTP file or module contains one or more of (i) unit modes or procedures according to unit modes built-in within PackML machine; (ii) variables of the PackTags section contained within the PackML information model. Additionally, a dedicated marker of the MTP may be defined, allowing the POL 108 to perform runtime translations in step 403, as described further below. Mapping of the existing PackML interface can be performed based on one or more of an interface of an existing unit 202 (as shown in FIG. 4), and offline information, e.g., a NodeSet export of the OPC UA server or Excel sheets of contained PackTags. The mapping comprises one or more of a service mapping, a data assembly mapping, and an HMI mapping.

For the service mapping, the main entity of PackML that is mappable to the MTP service is the unit operation mode. Beyond standard services like automatic or manual operation, a PackML module can contain an arbitrary number of custom operation modes. Automatic mapping can happen based on these services in case no custom parameters are to be mapped. In custom operation modes, user assistance may be obtained to mark which PackML PackTags are used by which operation modes. Those PackTags may then be included in the MTP service definition such that they can be set on a call. There are at least two different mapping strategies envisaged by the present disclosure: a first strategy is to implement a one-to-one mapping of PackML operation modes to MTP services, allowing for a fine-granular control over the unit; a second strategy is to implement a complex mapping of multiple module modes into one MTP service, for example switching from an automatic mode to a manual mode with an in-between reduction of machine speed.

For the data assembly mapping, one possibility is to map status or admin PackTags to Data Assembly structure within the MTP module, e.g., to allow the POL 108 to read and process parameters of the PackML unit 202, e.g., current machine speed. This mapping can be implemented manually by the engineer, for example for non-standard PackTags that are included in the module, or automatically by mapping all non-standard PackTags to service parameters. Any manual mappings can be recorded by the engineering system such that mapping for similar or recurring modules can be automatically implemented.

At step 402, import and parameterization of the MTP file 400 into the MTP POL 108 is performed. Relevant parameters include, for example, the IP address of the MTP instance and parameters for wrapped PackML services such as desired machine speed or unit operation mode. Import of the generated wrapper-MTP 400 into the POL 108 can be undertaken without major adjustments. As mentioned above, a marker may be included in the wrapper-MTP 400 such that the POL 108 can react and perform the runtime translation in step 403. This marker can be set using the standardized data structure of MTP, e.g., by a dedicated module type naming schema or a proprietary MTP parameter. Such markers may comprise one or more prefixes or suffixes of the OPC UA item mapped into MTP, an additional non-MTP type mentioned in an AutomationML file, and/or a comment on the XML level.

At step 403, runtime translation is performed between PackML and MTP communications. After loading the wrapper-MTP 400 into the POL 108, calls will be made to the PackML interface of the unit 202 to trigger services and monitor parameters. The POL 108 may therefore be supplemented by runtime translation functionality (not shown in FIG. 4) to translate between MTP and PackML communication interfaces such as translating values encoding the state of the unit 202, in order to overcome differences between MTP and PackML runtime information representation. The translation functionality may be implemented within the POL 108 or by an additional gateway-component that is located outside of the POL 108. Based on the marker in the wrapper-MTP file 400, the POL 108 or the gateway-component maps information within the PackML unit 202 to a compatible MTP representation. Alternatively, optional attributes of the distributed control system (e.g. the ABB System 800xA) can be utilized at runtime. This runtime mapping includes, but is not limited to: state information, e.g. current state and available transition states; representation of module operation state and ability to switch between these modes similarly to module state; and re-mapping of information needed to use data assembly mappings. Mapping of state information may be performed not only for PackML states that are present in MTP state model but also for states that are required by MTP but absent in MTP module definition, since PackML may omit such states. The same holds for additional states that the PackML unit 202 may contain but which are not present in the fixed MTP state set). Reading the current state may be performed differently on a POL-to-module communication level. For example, the PackML OPC UA model defines switching between the states by means of OPC UA method calls, while MTP uses variable writes.

For the HMI mapping, since PackML provides no dedicated information about its physical structure, e.g., necessary or provided product interfaces or internal structure, this information portion of the MTP may be replaced by either a generic placeholder or a dedicated unit-specific mapping, e.g., for complex machines having multiple product inputs and outputs. Automatic or semi-automatic provisioning can also be performed, e.g., generation of parameter HMI faceplates based on existing PackTags of PackML.

As mentioned above, in the second variant of the first example, the discrete part is integrated as a single MTP module 102 within the continuous part of the hybrid modular plant. Each PackML machine 202 provides a single service, with the production line 210 being represented by a single MTP module 102 combining all the services of the PackML machines 202 of the line 210, e.g., filling the product in multiple packaging types. The complete production line 210 is controlled by the POL 108 operating in the continuous part. In addition to this, the engineering may be integrated for both the discrete and continuous parts. This means the production line could be defined as a module according to the relevant standard (e.g., VDI 2658, Automation engineering of modular systems in the process industry—General concept and interfaces) and each machine could be a service, as defined by the same standard. The resulting MTP could be used in engineering and only a wrapper 500 for the runtime (mainly converting the integers used in PackML to bits used in MTP) may be needed. The described solutions for MTP to PackML conversion can also be applied vice versa, i.e., to represent MTP modules by PackML interfaces, as described further below.

Figure 5:
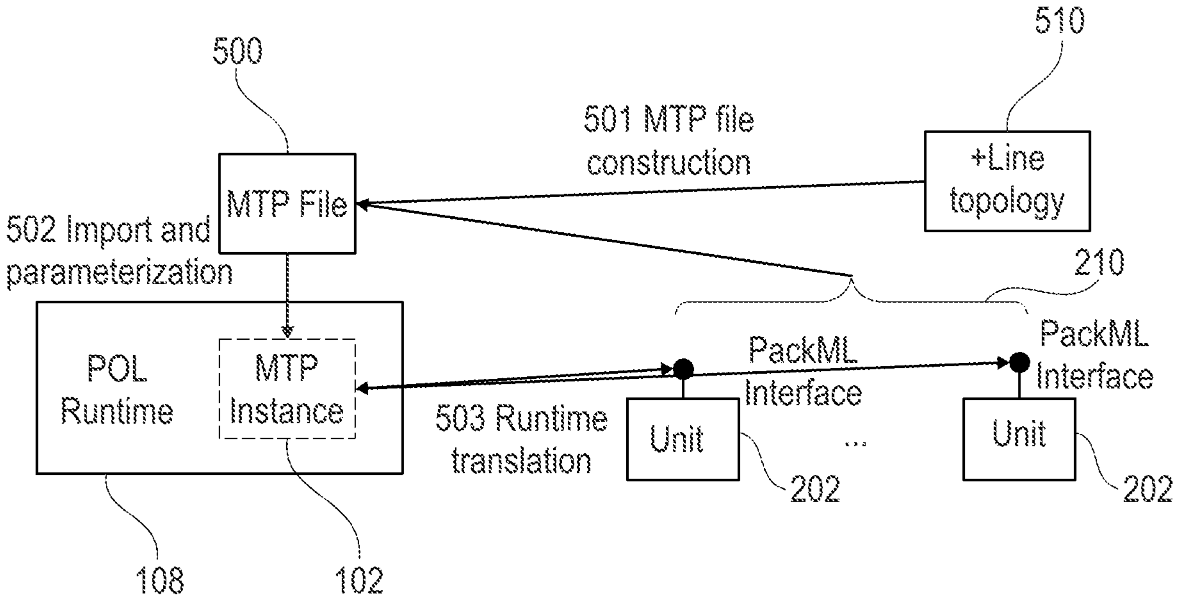
FIG. 5 illustrates method steps that may be performed to import multiple interconnected PackML machines into the MTP process orchestration layer.

FIG. 5 illustrates method steps that may be performed to import multiple interconnected PackML machines 202 into the MTP POL 108. The method is performed in order to represent the production line 210 comprising multiple PackML modules 202 as a single MTP module 102 from viewpoint of the MTP POL 108. As with FIG. 4, the method of FIG. 5 includes the steps of constructing 501 an MTP file 500; importing and parameterizing 502 the file 500 into the POL 108; and runtime translation 503 between PackML and MTP communications.

The mapping procedure for constructing the MTP file 500 in step 501 can be performed similarly to the mapping of a single module as described above in relation to step 401, except that a line mapping based on the line topology 510 (comprising, e.g., the physical order of PackML units 202) is additionally used. By using the topology information 510, the POL 108 can determine an overall state of the line 210, e.g., the condition of the whole line 210 may be changed in the event of a condition change in some non-redundant PackML unit 202. At engineering time, logic can be defined and wrapped into an MTP service, such as starting or stopping the whole line 210 and changing the produced processed within the line 210. Broadly speaking, the wrapping/mapping description of multiple PackML machines 202 combined into the production line 210 into the MTP-compatible abstraction 500 representing the production line 210 as one MTP-module 102 may comprise: monitoring the production line 210 using its topology information 510 and defining operation states of the production line 210 as MTP-module states, e.g. a defect in one module of the line would cause the state of the entire line to change. For example, the method may comprise synchronously reducing speed of all line machines or changing the production mode of the line, e.g., by changing the format or layout of used packaging.

Step 502 may be performed as described above in relation to step 402.

Runtime translation 503 becomes more complex than in step 403, since multiple calls may be marshalled to PackML interfaces and any custom service logic defined in step 501 may be evaluated by the POL 108, e.g., by running some pre-compiled routines.

An alternative method of mapping the production line involves an orchestration of multiple MTP modules 102 that are converted from PackML using the above-described techniques. For some use cases, an MTP-black-box representation might be a more suitable approach, e.g., to reduce complexity within the POL 108. Furthermore, custom complex line-based services can be defined during the mapping/construction procedure that might use a different syntax to the POL 108.

According to a second example, a PackML-first approach is taken by implementing an MTP-to-PackML mapping to represent MTP modules 102, and to allow control of the MTP module 102, by a PackML interface.

Figure 6:
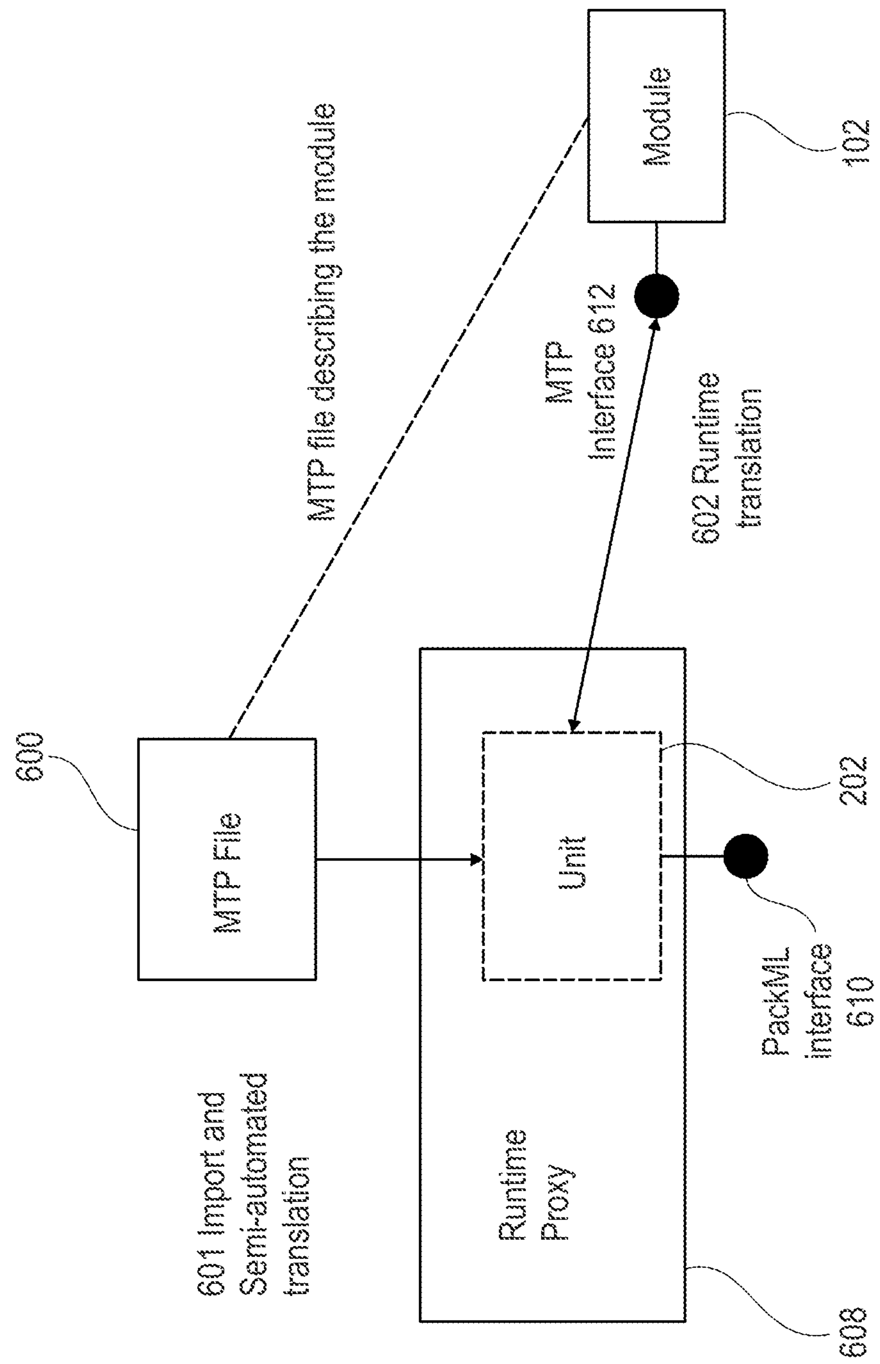
FIGS. 6 and 7 illustrate a method of integrating MTP modules into PackML by representing the MTP modules via PackML interfaces.
Figure 7:
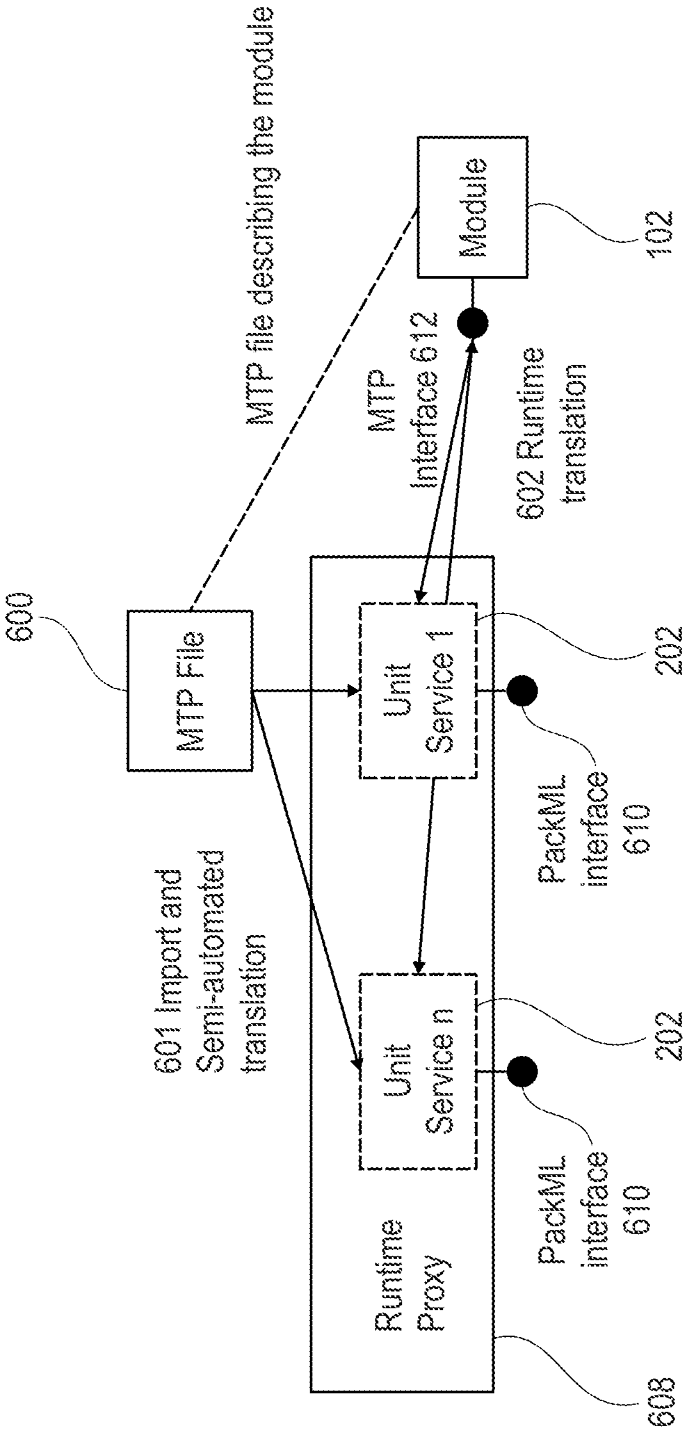

FIGS. 6 and 7 illustrate the procedure in more detail for an MTP module 102 and the corresponding MTP file 600.

At step 601, the MTP file 600 is imported and translated. The MTP file 600 and MTP instance information (e.g., OPC UA endpoint) may be imported at engineering time or run time, for example re-using existing POL information. In more detail, in step 601, a runtime proxy component 608 is parametrized using the imported MTP file 600 and an endpoint address of the MTP module 102, and a PackML compatible representation 202 of the module 102 is constructed using a mapping algorithm.

The mapping algorithm is similar to that described above in relation to the PackML-to-MTP in a vice versa fashion, including one or more of the following steps: a state model mapping is performed (the MTP state model is not extensible, so almost a direct mapping is possible); (ii) services of MTP are mapped to operation modes of the PackML proxy; (iii) data assemblies within MTP are mapped to PackTags of the PackML unit according to a pre-defined or user-provided mapping.

Stated differently, wrapping/mapping the description of a single MTP module 102 into a PackML interface 610 for a single PackML machine 202 may include one or more of the following steps: monitoring information of the machine like current state of the MTP module 102, available transitions and error/alarm information via PackML-compatible interfaces (state, mode PackTags); changing operational mode and call services of MTP module 102 via PackML interfaces; accessing additional functional and non-functional information of MTP (e.g. module parameters and DataAssemblys) via PackML PackTags; automated or semi-automated generation of PackTag documentation based on existing/used MTP structure; and defining logic between the MTP and PackML parts of the hybrid modular plant represented in the POL 108. Defining logic may include changing behavior of the MTP plant part based on PackML equipment conditions such as throttle upstream production in, e.g., a brewing process in case of downstream malfunction in the bottle filling process, or increase bottle filling speed based on some brewing process conditions; and collecting data based on conditions, events of both plant parts for root cause analysis.

Since MTP can contain multiple services, a mapping to several logical PackML interfaces 610 may be required, as indicated in FIG. 7, which shows multiple representations of the MTP services as respective PackML units 202 ("Unit services 1-*n*") each including a PackML interface 610.

At step 602, runtime translation is performed. In more detail, the runtime proxy component 608 starts a PackML-compatible OPC UA server, and requests to the PackML interface 610 of the runtime proxy 608 are then translated into calls to the MTP interface 612 of the MTP module 102. For example, OPC UA method calls of the PackML model are converted to variable reads/writes of the MTP interface.

Thus, for integrating the continuous part into the discrete part, the step of constructing one or more interfaces 610 representing each continuous-part module 102 as one or more respective discrete-part units 202 may further comprise importing and translating (601) a file 600 representing a said continuous-part module 102, constructing (601) a discrete-part representation 202 of the said continuous-part module 102, the discrete-part representation being associated with a said interface 610, and performing (602) runtime translations of communications between the said interface 610 and an interface 612 of the continuous-part module 102.

The present disclosure is applicable to brewing, pharmaceuticals, cell production and food and beverage applications where process and non-process (discrete) modules are used.

Figure 8:
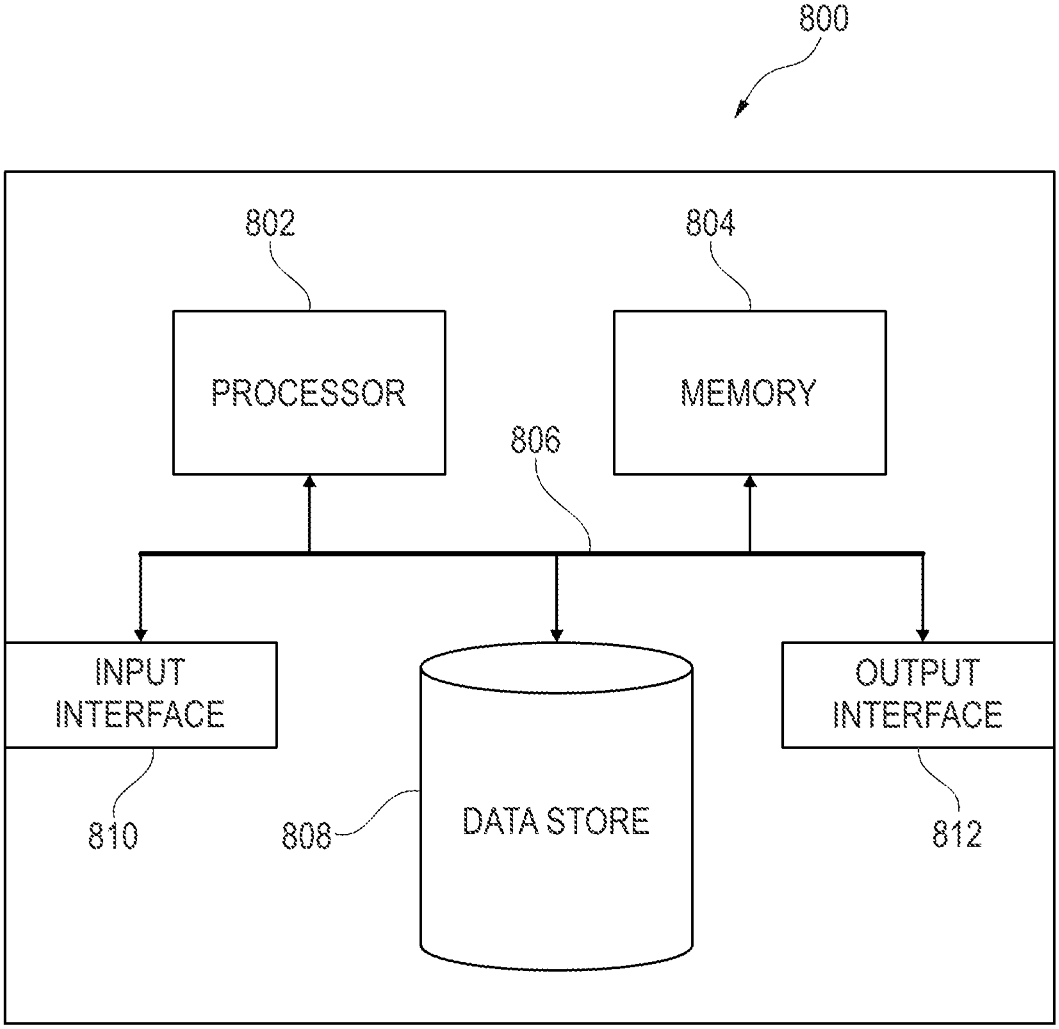
FIG. 8 illustrates a computing device that can be used in accordance with the systems and methods disclosed herein.

Referring now to FIG. 8, a high-level illustration of an exemplary computing device 800 that can be used in accordance with the systems and methodologies disclosed herein is illustrated. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While the invention has been illustrated and described in detail in the drawings and foregoing description, such illustration and description are to be considered exemplary and not restrictive. The invention is not limited to the disclosed embodiments. In view of the foregoing description and drawings it will be evident to a person skilled in the art that various modifications may be made within the scope of the invention, as defined by the following claims.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of integrating modules into a hybrid modular plant comprising a discrete manufacturing part and a continuous manufacturing part, the method comprising:

integrating the discrete manufacturing part into the continuous manufacturing part by, at least in part constructing at least one module definition file comprising a Module Type Package (MTP) file mapping one or more discrete-part units of the discrete manufacturing part to a continuous-part module and importing the MTP file into a Process Orchestration Layer (POL) of the continuous manufacturing part; and running the hybrid modular plant, comprising, based on a marker included in the MTP file, performing runtime translations of communications between the discrete manufacturing part and the continuous manufacturing part by translating Packaging Machine Language (PackML) common communication protocol calls into MTP variable reads/writes, wherein the discrete manufacturing part comprises a PackML part, and wherein the continuous manufacturing part comprises an MTP part.

2. The method of claim 1, wherein integrating the discrete manufacturing part into the continuous manufacturing part comprises integrating the discrete-part units individually into the POL as respective continuous-part modules.

3. The method of claim 1, further comprising (i) configuring control sequences or recipes running in the continuous manufacturing part to execute services of the discrete manufacturing part, (ii) configuring control sequences or recipes running in the discrete manufacturing part to execute services of the continuous manufacturing part, or both (i) and (ii).

4. The method of claim 1, wherein integrating the discrete manufacturing part into the continuous manufacturing part comprises integrating a production line of the discrete manufacturing part as a single continuous-part module within the continuous manufacturing part of the hybrid modular plant.

5. The method of claim 4, further comprising using topology information pertaining to the production line of the discrete manufacturing part to define operation states of the production line as continuous-part module states.

6. The method of claim 1, wherein constructing the at least one module definition file comprises generating a service mapping which maps at least one unit operation mode of a said discrete-part unit to a continuous-part module service.

7. The method of claim 6, further comprising generating the service mapping as a one-to-one mapping of a single said unit operation mode of the said discrete-part unit to the continuous-part module service.

8. The method of claim 6, further comprising generating the service mapping as a complex mapping of multiple said unit operation modes to the continuous-part module service.

9. The method of claim 1, wherein constructing the at least one module definition file comprises generating a data assembly mapping tags or labels for parameters of the discrete manufacturing part to equivalent tags or labels in the continuous manufacturing part.

10. The method of claim 1, wherein constructing the at least one module definition file comprises generating an HMI mapping which maps human-machine-interface elements of the said discrete-part units to equivalent elements of a continuous-part module using either a generic placeholder or a dedicated unit-specific mapping.

11. The method of claim 1, wherein performing the runtime translations is based on a marker added to the module definition file.

12. The method of claim 1, wherein the marker is set using a dedicated module type naming schema or a proprietary MTP parameter.

13. A method of integrating modules into a hybrid modular plant comprising a discrete manufacturing part and a continuous manufacturing part, the method comprising:

integrating the continuous manufacturing part into the discrete manufacturing part by, at least in part, constructing one or more Module Type Package (MTP) interfaces representing each continuous-part module as one or more respective discrete-part units, importing and translating a Module Type Package (MTP) file representing the continuous-part module, and constructing a Packaging Machine Language (PackML) representing a discrete-part representation of the continuous-part module, the discrete-part representation being associated with a PackML interface; and running the hybrid modular plant, comprising performing runtime translations of communications between the discrete manufacturing part and the continuous manufacturing part by translating requests to the PackML interface into calls to the MTP interface by converting common communication protocol calls into MTP variable reads/writes, wherein the discrete manufacturing part comprises a PackML part, and wherein the continuous manufacturing part comprises an MTP part.

* * * * *